United States Patent
Fujimaru et al.

(10) Patent No.: US 8,552,134 B2
(45) Date of Patent: Oct. 8, 2013

(54) METHOD OF PRODUCING POLYACRYLIC ACID (SALT) WATER-ABSORBENT RESIN

(75) Inventors: Hirotama Fujimaru, Osaka (JP); Eri Goto, Hyogo (JP); Kunihiko Ishizaki, Osaka (JP); Atsushi Motoyama, Hyogo (JP)

(73) Assignee: Nippon Shokubai Co., Ltd., Osaka (JP)

( * ) Notice: Subject to any disclaimer, the term of this patent is extended or adjusted under 35 U.S.C. 154(b) by 962 days.

(21) Appl. No.: 11/693,355

(22) Filed: Mar. 29, 2007

(65) Prior Publication Data

US 2007/0232760 A1 Oct. 4, 2007

(30) Foreign Application Priority Data

Mar. 29, 2006 (JP) .................................. 2006-91566

(51) Int. Cl.
| | | |
|---|---|---|
| C08F 220/06 | (2006.01) | |
| C08F 16/12 | (2006.01) | |
| C08F 2/00 | (2006.01) | |
| C08F 2/16 | (2006.01) | |

(52) U.S. Cl.
USPC ................ 526/318; 526/72; 526/89; 526/333

(58) Field of Classification Search
USPC ....................... 524/72, 318, 333, 89
See application file for complete search history.

(56) References Cited

U.S. PATENT DOCUMENTS

| | | | |
|---|---|---|---|
| 4,286,082 A | 8/1981 | Tsubakimoto et al. | |
| 4,351,922 A | 9/1982 | Yoshida et al. | |
| 4,654,039 A | 3/1987 | Brandt et al. | |
| 5,506,324 A | 4/1996 | Gartner et al. | |
| 5,532,323 A | 7/1996 | Yano et al. | |
| 5,562,646 A | 10/1996 | Goldman et al. | |
| 5,574,121 A | 11/1996 | Irie et al. | |
| 5,837,789 A | 11/1998 | Stockhausen et al. | |
| 5,985,944 A | 11/1999 | Ishizaki et al. | |
| 6,037,431 A * | 3/2000 | Shioji et al. ................... | 526/320 |
| 6,087,450 A | 7/2000 | Breitbach et al. | |
| 6,143,821 A | 11/2000 | Houben | |
| 6,251,960 B1 | 6/2001 | Ishizaki et al. | |
| 6,835,325 B1 | 12/2004 | Nakamura et al. | |
| 2002/0120085 A1 * | 8/2002 | Matsumoto et al. ........ | 526/317.1 |
| 2005/0154146 A1 * | 7/2005 | Burgert .......................... | 525/337 |
| 2005/0176910 A1 | 8/2005 | Jaworek et al. | |
| 2005/0215752 A1 | 9/2005 | Popp et al. | |
| 2005/0272600 A1 * | 12/2005 | Wada et al. .................. | 502/400 |
| 2006/0020078 A1 | 1/2006 | Popp et al. | |

FOREIGN PATENT DOCUMENTS

| | | |
|---|---|---|
| CN | 1344756 | 4/2002 |
| EP | 1374919 | 1/2004 |
| EP | 1598392 A2 | 11/2005 |
| JP | 56-136808 A | 10/1981 |
| JP | 63-297408 A | 5/1988 |
| JP | 2002-265528 A | 9/2002 |
| WO | 0168375 | 9/2001 |
| WO | 2006-109882 A1 | 10/2006 |

OTHER PUBLICATIONS

Partial European Search Report for European Application No. 07 10 5112.2 dated Jun. 11, 2007.
Chinese Office Action for 2007100913240 mailed on Dec. 25, 2009.
Japanese Office Action dated Nov. 24, 2011, issued in corresponding Japanese Patent Application No. 2007-069821.

* cited by examiner

*Primary Examiner* — Karuna P Reddy
(74) *Attorney, Agent, or Firm* — Nixon & Vanderhye PC

(57) ABSTRACT

A method of producing a water-absorbent resin of the present invention reduces amounts of a residual cross-linking agent and a residual surfactant, achieves high productivity, and improves physical properties of the resultant water-absorbent, such as absorption capacity, extractable polymer content, powder friction, and gel crushability. The method includes the steps of: polymerizing an aqueous monomer solution containing as a major component an acrylic acid monomer in the presence of a cross-linking agent; and drying the resultant polymer by heating, in which the cross-linking agent is a multifunctional (meth)acrylate cross-linking agent having polyethylene glycol structural units including a total of 6 to 200 ethylene oxide repeating units, and the aqueous monomer solution includes a mono(meth)acrylate compound having polyethylene glycol structural units in an amount of 0.1 to 30% by weight relative to an amount of the multifunctional (meth)acrylate cross-linking agent.

19 Claims, No Drawings

METHOD OF PRODUCING POLYACRYLIC ACID (SALT) WATER-ABSORBENT RESIN

This application claims priority under 35 U.S.C. Section 119 to Japanese Patent Application No. 2006-91566 filed on Mar. 29, 2006, which is herein incorporated by reference.

BACKGROUND OF THE INVENTION

1. Field of the Invention

The present invention relates to a method of producing a polyacrylic acid (salt)-based water-absorbent resin. Specifically, the present invention relates to a method of producing a water-absorbent resin with high physical properties and excellent safety at high productivity.

2. Description of the Related Art

In recent years, water-absorbent resins are developed as cross-linked synthetic polymers having a high degree of water absorbency, and are widely used for absorbent articles such as disposable diapers and sanitary napkins, water-retaining agents for agriculture and horticulture, and industrial sealing materials. As for the water-absorbent resins described above, many kinds of monomers and hydrophilic polymers are proposed as their raw materials. Among those materials, acrylic acid-based water-absorbent resins, which use as the monomer acrylic acid and/or salts thereof are most widely industrially used owing to their high water absorbency.

In particular, sanitary materials such as disposable diapers have achieved advanced functionality and have been thinned. The amount or ratio (ratio in an absorbing article, % by weight) of a water-absorbent resin to be used in the sanitary materials is increased to obtain the thinner sanitary materials, while securing the increase in the amount of absorbed water and leakage prevention ability. Therefore, the water-absorbent resins are required to have high physical properties.

Examples of the physical properties required for the water-absorbent resin include reduction in an amount of an uncross-linked water-soluble polymer, which is conflicting to an increase in absorption capacity (U.S. Pat. No. 4,654,039), and the physical properties under load such as absorption capacity under load and liquid permeability under load (U.S. Pat. No. 5,562,646).

The water-absorbent resin has a cross-linked structure preferably inside of polymer, more preferably on a surface of the polymer as well as the inside thereof, so the cross-linking method greatly affects the physical properties. To this end, there have been proposed methods involving using particular cross-linking agents or particular cross-linking conditions in a step of polymerization and/or surface cross-linking.

For example, there have been proposed various methods involving using various materials as the cross-linking agents and cross-linking conditions in the polymerization step, which include: methods involving using polyoxyalkylene glycol di(meth)acrylate or the like as an internal cross-linking agent (U.S. Pat. No. 4,351,922 and U.S. Pat. No. 5,532,323); methods involving using particular trimethylolpropane triacrylate (U.S. Pat. No. 5,574,121 and U.S. Pat. No. 5,506,324); methods involving using polyallyl ether as an internal cross-linking agent (WO 97/18890, U.S. Pat. No. 5,837,789, and WO 01/29132); methods involving using polyalkoxylated trimethylolpropane acrylic ester (WO 2003/104302, WO 2003/104299, and WO 2003/104300); and a method involving using polyunsaturated amino alcohol (U.S. Pat. No. 6,087,450).

Also proposed is a process involving using a surfactant in combination with an internal cross-linking agent in the polymerization step (U.S. Pat. No. 4,286,082, U.S. Pat. No. 5,985,944, and U.S. Pat. No. 6,251,960).

Further, there has been proposed a method involving using as cross-linking agents particular three cross-linking agents in combination (U.S. Pat. No. 5,837,789).

U.S. Pat. No. 4,654,039, U.S. Pat. No. 5,562,646, U.S. Pat. No. 4,351,922, U.S. Pat. No. 5,532,323, U.S. Pat. No. 5,574,121, U.S. Pat. No. 5,506,324, WO 97/18890, U.S. Pat. No. 5,837,789, WO 01/29132, WO 2003/104302, WO 2003/104299, WO 2003/104300, and U.S. Pat. No. 6,087,450 each propose methods involving using particular cross-linking agents and particular cross-linking conditions to improve the physical properties of the water-absorbent resins. However, those methods cause problems such as lowering the safety and surface tension due to presence of the cross-linking agents, delay of polymerization and increase in the amount of residual monomers, and coloring of final products, so it is hardly to say that the physical properties of the water-absorbent resins have been sufficiently improved. Meanwhile, methods involving using surfactants in the polymerization step, which are disclosed in U.S. Pat. No. 4,286,082, U.S. Pat. No. 5,985,944, and U.S. Pat. No. 6,251,960, sometime cause problems such as not only increasing cost but also lowering the surface tension due to the residual surfactants. In addition, the technology disclosed in U.S. Pat. No. 5,837,789 insufficiently improves the absorption capacity of the water-absorbent resin from the aspect of affinity to acrylic acid monomers and copolymerization characteristics.

SUMMARY OF THE INVENTION

It is an object of the present invention, in a method of producing a water-absorbent resin, to reduce amounts of a residual cross-linking agent and a residual surfactant, to achieve high productivity, and to improve physical properties of the resultant water-absorbent resin, such as absorption capacity, extractable polymer content, powder friction, and gel crushability.

The inventors of the present invention have made studies to solve the above-mentioned problems. As a result, they have found that the above-mentioned problems can be solved by, in producing a water-absorbent resin, using as an internal cross-linking agent a multifunctional (meth)acrylate-based cross-linking agent having polyethylene glycol structures, and by adding a mono(meth)acrylate compound having polyethylene glycol structures in a predetermined amount relative to the amount of the multifunctional (meth)acrylate-based cross-linking agent, or by controlling a molecular weight distribution of the multifunctional (meth)acrylate-based cross-linking agent to have a narrow range.

According to an aspect the present invention, there is provided a method of producing a water-absorbent resin, including the steps of: polymerizing an aqueous monomer solution containing as a major component an acrylic acid monomer in the presence of a cross-linking agent; and drying the resultant polymer by heating, wherein the cross-linking agent includes a multifunctional (meth)acrylate-based cross-linking agent having polyethylene glycol structural units including a total of 6 to 200 ethylene oxide repeating units, and the aqueous monomer solution includes a mono(meth)acrylate compound having polyethylene glycol structural units in an amount of 0.1 to 30% by weight relative to an amount of the multifunctional (meth)acrylate-based cross-linking agent.

According to another aspect of the present invention, there is provided a method of producing a water-absorbent resin, including the steps of: polymerizing an aqueous monomer solution containing as a major component an acrylic acid monomer in the presence of a cross-linking agent; and drying the resultant polymer by heating, wherein the cross-linking agent includes a multifunctional (meth)acrylate-based cross-linking agent having polyethylene glycol structural units including a total of 6 to 200 ethylene oxide repeating units, and a molecular weight distribution defined based on a distribution index of the ethylene oxide repeating units of the multifunctional (meth)acrylate-based cross-linking agent is 50 to 100%.

According to a preferable aspect of the present invention, the aqueous monomer solution includes a (meth)acryloyloxy acrylate-based cross-linking agent having polyethylene glycol structural units in an amount of 0.01 to 30% by weight relative to an amount of the multifunctional (meth)acrylate-based cross-linking agent.

According to another preferable aspect of the present invention, a ratio of a number of the polyethylene glycol structural units of the multifunctional (meth)acrylate-based cross-linking agent to a number of the polyethylene glycol structural units of the mono(meth)acrylate compound is in a range of 0.5 to 2.0.

According to still another preferable aspect of the present invention, the aqueous monomer solution contains the mono (meth)acrylate compound in an amount of $1.0 \times 10^{-5}$ to 0.5 mol % and the multifunctional (meth)acrylate-based cross-linking agent in an amount of $1.0 \times 10^{-3}$ to 1.0 mol % relative to the amount of the acrylic acid monomer.

According to a preferable aspect of the present invention, the method of producing a water-absorbent further includes the step of surface cross-linking including heating after the step of drying the resultant polymer by heating.

According to another preferable aspect of the present invention, the acrylic acid monomer contains a polymerization-inactive organic compound having a solubility parameter of $1.0 \times 10^4$ to $2.5 \times 10^4$ $(Jm^{-3})^{1/2}$ in an amount of 1 to 1,000 ppm by weight.

According to still another preferable aspect of the present invention, the acrylic acid monomer contains iron in an amount of 0.01 to 5 ppm by weight.

The method of producing a water-absorbent resin of the present invention can reduce the amounts of a residual cross-linking agent and a residual surfactant, facilitate control of a polymerization reaction, and improve physical properties of the resultant water-absorbent resin (for example, it can improve the relationship between "absorption capacity" and "extractable polymer content", which are conflicting basic physical properties of the water-absorbent resin), thereby producing a water-absorbent resin having good powder properties at high productivity without reducing surface tension of the water-absorbent resin.

DESCRIPTION OF THE PREFERRED EMBODIMENTS (1) Water-Absorbent Resin and Monomer Thereof
[Water-Absorbent Resin]

In the present description, the term "cross-linked water-absorbent resin" refers to a water-swellable water-insoluble polymer in which a cross-linked structure is incorporated into a polymer. The term "water-swellable" refers to a state where the absorption capacity without load (GVs) to physiological saline is 3 g/g or more, preferably in the range of 5 to 200 g/g, more preferably in the range of 20 to 100 g/g. The term "water-insoluble" refers to a substantially insoluble state, i.e., a state where the extractable polymer content in a resin is in the range of 0 to 50% by weight, preferably 0 to 25% by weight, more preferably 0 to 15% by weight, still more preferably 0 to 10% by weight. Methods of determining those properties will be described below.

Note that, in the present specification, a composition containing a water-absorbent resin and a small amount of an additive (such as inorganic powder, deodorant, antibacterial agent, hydrophilic polymer, and hydrophobic polymer) is also referred to as a water-absorbent resin.
[Monomer]

In the present invention, the term "acrylic acid monomer" refers to an acrylic acid and/or its salt.

From the aspect of physical properties, an aqueous monomer solution containing an acrylic acid monomer as a major component is used for polymerization in the present invention. The acrylic acid monomer content is 50 mol % or more, preferably 70 mol % or more, more preferably 90 mol % or more, still more preferably 95 mol % or more relative to the total monomers (exclusive of crosslinking agents) as used for the polymerization.

From the aspect of physical properties, the above-mentioned acrylate is preferably a monovalent salt of acrylic acid including alkaline metal salt, ammonium salt, or amine salt, more preferably an alkaline metal acrylate, still more preferably an acrylate such as sodium salt, lithium salt, and potassium salt. Note that polyvalent metal salts such as a calcium salt and an aluminum salt may be further added as long as the polymer is water-swellable.

In a water-absorbent resin produced in the present invention, acid moiety derived from an acid moiety-containing monomer such as an acrylic acid are preferably neutralized. The neutralization rate is generally 20 to 100 mol %, preferably 50 to 95 mol %, more preferably 60 to 90 mol %. The neutralization may be performed either to the monomer component before polymerization or to the polymer during or after the polymerization. Further, the steps of neutralizing a monomer component and neutralizing a polymer may be combined with each other.

The "other monomers" excluding an acrylic acid monomer may be used at a rate of 50 mol % or less relative to the total monomers (exclusive of cross-linking agents) as used for the polymerization. Examples of the other monomers include monomers shown in the below-described US patents or EU patents. Specific examples thereof further include: water-soluble or hydrophobic unsaturated monomers that serve as copolymerization components, such as methacrylic acid, maleic acid (anhydride), fumaric acid, crotonic acid, itaconic acid, vinylsulfonic acid, 2-(meth)acrylamide-2-methylpropanesulfonic acid, (meth)acryloxyalkanesulfonic acid and their alkaline metal salts and ammonium salts, N-vinyl-2-pyrrolidone, N-vinylacetamide, (meth)acrylamide, N-isopropyl (meth)acrylamide, N,N-dimethyl (meth)acrylamide, 2-hydroxyethyl (meth)acrylate, methoxypolyethylene glycol (meth)acrylate, polyethylene glycol (meth)acrylate, isobutylene, and lauryl (meth)acrylate.

The content of the other monomers is less than 50 mol %, preferably 0 to 30 mol %, more preferably 0 to 10 mol %, particularly preferably 0 to 1 mol % relative to the total monomers (exclusive of cross-linking agents) as used for the polymerization. Use of the other monomers at the above-mentioned rate can improve the absorption property of a water-absorbent resin produced in the present invention and produce the water-absorbent resin at a lower cost.
[Multifunctional (Meth)Acrylate-Based Cross-Linking Agent and Mono(Meth)Acrylate Compound]

In the present invention, a multifunctional (meth)acrylate-based cross-linking agent having polyethylene glycol structural units including a total of 6 to 200 ethylene oxide repeating units is used as an internal cross-linking agent. In one embodiment, a predetermined mono(meth)acrylate compound is further added to an aqueous monomer solution in a predetermined amount, while in another embodiment, the molecular weight distribution of the cross-linking agent is controlled. Note that, in the present specification, the term "(meth)acrylate" is a collective term of methacrylates, acrylates, and mixtures thereof. In the present invention, an acrylate is preferably used.

Hereinafter, description will be made on the multifunctional (meth)acrylate-based cross-linking agent having polyethylene glycol structural units including a total of 6 to 200 ethylene oxide repeating units and mono(meth)acrylate compound.

In the present invention, the mono(meth)acrylate compound having polyethylene glycol structural units has a polyethyleneglycol chain in its molecule and has one end of a (meth)acrylate and the other end of any appropriate substituent. Examples of the substituent include alkyl, allyl, phenyl, and hydroxyl groups, and from the aspect of improvement of physical properties, the substituent is preferably a hydroxyl group.

In the present invention, the multifunctional (meth)acrylate-based cross-linking agent having polyethylene glycol structural units has a polyethylene glycol chain in its molecule and has a plurality of, preferably 2 to 10, more preferably 2 to 6 ends of (meth)acrylates and at least one of the other ends of any appropriate substituent such as an alkyl, allyl, or phenyl group.

The compound having polyethylene glycol structural units may be any appropriate compound as long as it has polyethylene glycol structural units in its molecule. Examples thereof include mono or multifunctional acrylates for various EO (ethylene oxide) adducts of polyvalent alcohols such as polyethylene glycol and polyethylene glycol derivatives including propylene glycol, 1,3-propanediol, dipropylene glycol, 2,3,4-trimethyl-1,3-pentanediol, polypropylene glycol, glycerine, polyglycerine, 2-butene-1,4-diol, 1,4-butanediol, 1,3-butanediol, 1,5-pentanediol, 1,6-hexanediol, 1,2-cyclohexanedimethanol. Among them, polyethylene glycol monoacrylate is preferable.

Examples of the multifunctional (meth)acrylate-based cross-linking agent include EO-added propylene glycol di(meth)acrylate, polyethylene glycol di(meth)acrylate, EO-added neopentyl glycol di(meth)acrylate, EO-added trimethylolpropane di(meth)acrylate, EO-added trimethylolpropane tri(meth)acrylate, EO-added glycerol tri(meth)acrylate, EO-added pentaerythritol tetra(meth)acrylate, EO-added pentaerythritol tri(meth)acrylate, EO-added dipentaerythritol hexa(meth)acrylate, and EO-added tripentaerythritol octa(meth)acrylate. Note that the EO-added compounds refers to compounds having polyethylene glycol structures, and the compounds are not always produced by EO addition and may be produced by any appropriate method.

The total number of ethylene oxide repeating units in a polyethylene glycol structural unit in a multifunctional (meth)acrylate-based cross-linking agent is in the range of 6 to 200, preferably 6.5 to 100, more preferably 7 to 50, still more preferably 8 to 40 per molecule of the cross-linking agent. In the case where the total number of ethylene oxide repeating units in a polyethylene glycol structural unit in a multifunctional (meth)acrylate-based cross-linking agent is in the above-mentioned ranges, an aqueous solution of the cross-linking agent has low turbidity and high transmission.

In the case where the average number of added ethylene oxide molecule(s) is less than 5, the absorption property of the water-absorbent resin produced in the present invention may be lowered. In the case where the average number of added ethylene oxide molecule(s) is more than 200, the heat resistance of the water-absorbent resin produced in the present invention may be lowered. Note that, in the case where a compound has a plurality of polyethylene glycol structures (for example, an EO adduct of trimethylolpropane), the total number of ethylene oxide repeating units is calculated by summing a plurality of EO repeating units (for example, three units for the EO adduct of trimethylolpropane).

In the present specification, the term "ethylene oxide" has the same meaning as the term "polyethylene glycol", and the number of added ethylene oxide molecule(s) is a mean value of the numbers of ethylene oxide units in an internal cross-linking agent molecule. For example, for polyethylene glycol, an average number of ethylene oxide molecule(s) is calculated based on the weight-average molecular weight determined by gel permeation chromatography (GPC).

The distribution index of a multifunctional (meth)acrylate-based cross-linking agent having polyethylene glycol structural units represents distribution of the lengths of polyethylene glycol chains. The distribution index of a multifunctional (meth)acrylate-based cross-linking agent having polyethyleneglycol structural units is desirably as high as possible, and it is in the range of preferably 50 to 100, more preferably 60 to 100, still more preferably 70 to 100, particularly preferably 80 to 100, most preferably 90 to 100. In the case where the distribution index is less than 50, many multifunctional (meth)acrylate-based cross-linking agents having polyethylene glycol structural units with different numbers of added ethylene oxide molecules may be present, resulting in inhibition of polymerization control or lowering of absorption property.

From the aspect of physical properties, the rate of multifunctional (meth)acrylate-based cross-linking agents with average numbers of added ethylene oxide molecules of 4 or less or 300 or more is preferably 0 to 10% or less, more preferably 5% or less, still more preferably 2% or less, particularly preferably 0.5% or less.

From the aspect of the reactivity to an acrylic acid or a salt thereof and the physical properties of a water-absorbent resin produced in the present specification, the above-mentioned multifunctional (meth)acrylate-based cross-linking agent having polyethylene glycol structural units is preferably polyethylene glycol diacrylate, more preferably polyethylene glycol diacrylate having polyethylene glycol structural units with the total number of ethylene oxide repeating units of 8 to 40 per molecule of the cross-linking agent, still more preferably polyethylene glycol diacrylate having polyethylene glycol structural units with the total number of ethylene oxide repeating units of 8 to 20 per molecule of the cross-linking agent.

In the multifunctional (meth)acrylate-based cross-linking agent having polyethylene glycol structural units and mono (meth)acrylate compound having polyethylene glycol structural units, their ethylene oxide repeating units may be the same or different, but from the aspect of physical properties, the ratio of the repeating units is in the range of preferably 0.5 to 2.0, more preferably 0.7 to 1.5, still more preferably 0.8 to 1.3, particularly preferably 0.9 to 1.1.

The mono(meth)acrylate compound having polyethylene glycol structural units and multifunctional (meth)acrylate-based cross-linking agent having polyethylene glycol structural units are preferably water-soluble from the viewpoint of handling in actual production methods, fine adjustment of the amount of a cross-linking agent, physical properties (such as the extractable polymer content) of a water-absorbent resin produced in the present invention, and in the case where they are used as aqueous solutions of 20% by weight, for example, it is required that no precipitates or deposits are formed.

That is, the mono(meth)acrylate compound having polyethylene glycol structural units has the polyethylene glycol structural units, and therefore it is known as a water-soluble compound. In production of a water-absorbent resin, an extremely small quantity (for example, 0.1% by weight) of the mono(meth)acrylate compound is added to an aqueous acrylic acid monomer solution and is uniformly dissolved therein, so that its solubility has not been regarded. However, it has been clarified that, even if an aqueous solution of 20% by weight of mono(meth)acrylate compound is prepared using exactly the same mono(meth)acrylate compound, a certain type of compound cannot be dissolved. The solubility of the compound in the case where the compound is used as such an aqueous solution of 20% by weight has large effect on the physical properties of a water-absorbent resin produced in the present invention. For example, among commercially available mono(meth)acrylate compounds in the forms of aqueous solutions, some of them are uniformly dissolved in an aqueous acrylic monomer solution but form precipitates or deposits when used as an aqueous solution of 10 to 50% by weight of mono(meth)acrylate compound, for example. Water-absorbent resins produced from such compounds may have no desired physical properties.

Note that, for the purpose of improvement of the physical properties and stable production of the water-absorbent resin, the mono(meth)acrylate compound having polyethylene glycol structural units is added to an aqueous monomer solution at a concentration in the range of preferably 1 to 50% by weight, more preferably 1 to 20% by weight.

In the case where the mono(meth)acrylate compound having polyethylene glycol structural units and multifunctional (meth)acrylate-based cross-linking agent having polyethylene glycol structural units are used as aqueous solutions of 20% by weight, the light transmission at a wavelength of 500 nm is in the range of preferably 70 to 100%, more preferably 80 to 100%, still more preferably 90 to 100%, particularly preferably 95 to 100%, most preferably 98 to 100%.

In one embodiment of the present invention, the mono (meth)acrylate compound having polyethylene glycol structural units is added for polymerization at a concentration in the range of 0.1 to 30% by weight, preferably 0.1 to 20% by weight, more preferably 0.5 to 15% by weight, still more preferably 0.5 to 10% by weight, particularly preferably 0.6 to 10% by weight, most preferably 0.7 to 5% by weight relative to the multifunctional (meth)acrylate-based cross-linking agent having polyethylene glycol structural units.

In the case where the ratio of the mono(meth)acrylate compound having polyethylene glycol structural units is less than 0.1% by weight, the absorption property may be lowered. On the other hand, in the case where the ratio is more than 30% by weight, the heat resistance and absorption property of a water-absorbent resin produced in the present invention may be lowered.

To achieve the objects of the present invention, the amount of the mono(meth)acrylate compound to be used for polymerization is in the range of preferably $1.0 \times 10^{-5}$ to 0.5 mol %, more preferably 0.001 to 0.5 mol %, still more preferably 0.001 to 0.2 mol %, particularly more preferably 0.005 to 0.2 mol %, most preferably 0.005 to 0.1 mol % relative to acrylic acid monomers. Meanwhile, the amount of the multifunctional (meth)acrylate-based cross-linking agent to be used for polymerization is in the range of preferably 0.001 to 1.0 mol %, more preferably 0.001 to 0.5 mol %, still more preferably 0.001 to 0.2 mol %, particularly preferably 0.005 to 0.2 mol %, most preferably 0.005 to 0.1 mol % relative to acrylic acid monomers.

If the amounts of the multifunctional (meth)acrylate-based cross-linking agent and mono(meth)acrylate compound to be used for polymerization are beyond the above-mentioned ranges, desired absorption properties may not be obtained.

The amounts of the mono(meth)acrylate compound having polyethylene glycol structural units and multifunctional (meth)acrylate-based cross-linking agent having polyethylene glycol structural units to be used for polymerization may be adjusted by mixing them appropriately or by appropriately adjusting polyethylene glycol esterification and purification conditions and providing an appropriate mixture.

[Third (Meth)Acrylate Compound]

In the present invention, as the third (meth)acrylate compound, a (meth)acryloyloxy acrylate-based cross-linking agent having polyethylene glycol structural units may be added at a concentration in the range of preferably 0.01 to 30% by weight, more preferably 0.1 to 20% by weight, still more preferably 1 to 10% by weight relative to the multifunctional (meth)acrylate-based cross-linking agent. Use of the (meth)acryloyloxy acrylate-based cross-linking agent is preferable because heating after polymerization causes cut of the cross-linking points by reverse Michael addition (elimination), thereby improving absorption capacity.

The third (meth)acrylate compound can be synthesized by esterification of a polyvalent alcohol having polyethylene glycol structural units with acryloyloxy propionic acid. In this synthesis, acrylic acid may be added or may be used as a solvent. The (meth)acryloyloxy acrylate-based cross-linking agent has preferably one or more acrylate groups and (meth) acryloyloxy acrylate groups.

Examples of the third (meth)acrylate compound include (meth)acryloyloxy propionate-based cross-linking agent such as polyethylene glycol di(β-acryloyloxypropionate), polyethylene glycol monoacrylate-mono(β-acryloyloxypropionate), EO-added propylene glycol di (β-acryloyloxypropionate), EO-added propylene glycol monoacrylate-mono(β-acryloyloxypropionate), EO-added neopentyl glycol di(β-acryloyloxypropionate), EO-added neopentyl glycol acrylate-mono(β-acryloyloxypropionate), EO-added trimethylol propane tri(β-acryloyloxypropionate), and EO-added glycerol diacrylate-mono(β-acryloyloxypropionate).

[Another Internal Cross-Linking Agent]

In the present invention, another internal cross-linking agent other than a multifunctional (meth)acrylate-based cross-linking agent having polyethylene glycol structural units may be added for polymerization.

Examples of the another internal cross-linking agent include a cross-linking agent that polymerizes or reacts with acrylic acid, such as: cross-linking agents containing a plurality of polymerizable groups including N,N'-methylenebisacrylamide, (poly)propyleneglycol di(meth)acrylate, trimethylolpropane tri(meth)acrylate, trimethylolpropane di(meth)acrylate, trimethylolpropane tri(β-acryloyloxypropionate), and poly(meth)aryloyloxy alkane; cross-linking agents containing polymerizable groups and reactive groups including polyethylene glycol glycidyl ether; and cross-linking agents containing a plurality of reactive groups including ethylene glycol, polyethylene glycol, and glycerine. The agents may be used singly or in combination of two or more.

The amount of the another internal cross-linking agent to be used for polymerization is in the range of preferably 0 to 1.0 mol % or less, more preferably 0 to 0.1 mol %, still more preferably 0 to 0.01 mol % relative to acrylic acid monomers, and is preferably an 100 mol % or less, more preferably 50 mol % or less, still more preferably 20 mol % or less relative to a multifunctional (meth)acrylate-based cross-linking agent.

[Another Component for Polymerization]

Another trace component may be added to an aqueous monomer solution to be used in the present invention to improve physical properties and polymerizability. Specific examples thereof include a polymerization-inactive organic compound, methoxyphenol, Fe, and acrylic acid dimer. The compounds may be at ppm levels. Hereinafter, the trace component that may be added will be described in detail.

[Polymerization-Inactive Organic Compound]

In the present invention, to improve physical properties (a relationship between "absorption capacity" and "extractable polymer content"), a polymerization-inactive organic compound with a solubility parameter in the range of $1.0 \times 10^4$ to $2.5 \times 10^4$ $(Jm^{-3})^{1/2}$ is preferably contained in the total monomers to be used for polymerization at a concentration of 1 to 1,000 ppm by weight. Note that the term "polymerization-inactive organic compound" refers to an organic compound having no polymerizable unsaturated bond and refers to an organic compound having a saturated bond that does not cause polymerization by pyrolysis or radical polymerization with an oxidant/reductant, ultraviolet rays, or gamma rays or an aromatic compound.

The term "solubility parameter" refers to a cohesive energy density and includes the solubility parameters and δ values described in publications such as Polymer Handbook (3rd edition) (published by Wiley Science, p. 527-539) and Kagaku-binran Kiso-hen (edited by the Chemical Society of Japan) and a δ value calculated by assigning a Hoy's cohesive energy constant described on page 525 to the Small's formula described on page 524 in Polymer Handbook (3rd edition) (published by Wiley Science).

The amount of the polymerization-inactive organic compound to be used for polymerization is in the range of preferably 0.1 to 500 ppm by weight, more preferably 1 to 300 ppm by weight, still more preferably 5 to 300 ppm by weight, particularly preferably 10 to 300 ppm by weight, most preferably 10 to 100 ppm relative to the total monomers.

The solubility parameter is in the range of preferably $1.0 \times 10^4$ to $2.2 \times 10^4$ $(Jm^{-3})^{1/2}$, more preferably $1.1 \times 10^4$ to $2.0 \times 10^4$ $(Jm^{-3})^{1/2}$, still more preferably $1.3 \times 10^4$ to $2.0 \times 10^4$ $(Jm^{-3})^{1/2}$, particularly preferably $1.5 \times 10^4$ to $1.9 \times 10^4$ $(Jm^{-3})^{1/2}$.

From the viewpoint of environmental burden, the polymerization-inactive organic compound is preferably an organic compound containing no halogen, more preferably a hydrocarbon composed of only carbon and hydrogen atoms.

The boiling point of the polymerization-inactive organic compound is in the range of preferably 95 to 300° C., more preferably 130 to 260° C. Specifically, the compound is preferably at least one selected from heptane (b.p.: 95° C.), dimethylcyclohexane (b.p.: 132° C.), ethylcyclohexane, toluene (b.p.: 110° C.), ethylbenzene (b.p.: 136° C.), xylene (138 to 144° C.), diethyl ketone (b.p.: 101° C.), diisopropyl ketone (b.p.: 124 to 125° C.), methyl propyl ketone (b.p.: 102° C.), methyl isobutyl ketone, methyl-t-butyl ketone, n-propyl acetate (b.p.: 101° C.), n-butyl acetate (b.p.: 124 to 125° C.), diphenyl ether (b.p.: 259° C.), and diphenyl (b.p.: 255° C.). The compound is more preferably an aromatic compound, and from the viewpoint of polymerization properties and productivity, it is particularly preferably toluene, diphenyl ether, and diphenyl.

The polymerization-inactive organic compound is preferably contained in an aqueous solution of the monomers or multifunctional (meth)acrylate-based cross-linking agent before polymerization. To prepare the aqueous solution of the monomers or multifunctional (meth)acrylate-based cross-linking agent containing the polymerization-inactive organic compound, the compound may be added after or during preparation of an aqueous monomer solution, or may be contained in or added to a raw material (such as acrylic acid, the multifunctional (meth)acrylate-based cross-linking agent, water, or an alkaline compound) of the aqueous monomer solution in advance. In particular, the polymerization-inactive organic compound is preferably dissolved or contained in the aqueous solution of the acrylic acid or multifunctional (meth)acrylate-based cross-linking agent in advance because it is hydrophobic and generally water-insoluble.

The polymerization-inactive organic compound is disclosed, for example, in WO 2006/109845.

[Methoxyphenols]

In the present invention, methoxyphenols are preferably used for polymerization, and the amount thereof is more preferably in the range of 10 to 300 ppm relative to the total monomers to be used for polymerization. If the content of methoxyphenols is more than 300 ppm by weight relative to the total monomers to be used for polymerization, a water-absorbent resin produced in the present invention may become colored (become tinged with yellow/turn yellow) in some cases. On the other hand, if the content of methoxyphenols is less than 10 ppm by weight, in particular, less than 5 ppm by weight relative to the total monomers to be used for polymerization, for example, if methoxyphenols serving as a polymerization inhibitor is removed by purification such as distillation, polymerization may occur before deliberately starting polymerization, and the polymerization rate may be lowered. In order to mix the methoxyphenols in an aqueous monomer solution uniformly, the methoxyphenol is preferably dissolved in acrylic acid or a multifunctional (meth)acrylate-based cross-linking agent before use.

Examples of the methoxyphenols include o, m, and p-methoxyphenols (ortho, meta, and para-methoxyphenols) and methoxyphenols having one or more substituents such as methyl, t-butyl, and hydroxyl groups. Among them, p-methoxyphenol is preferable.

The methoxyphenols are disclosed, for example, in WO 2003/51940.

[Trace Component in Acrylic Acid]

In one preferred embodiment of a method of producing a water-absorbent resin of the present invention, there is used an acrylic acid monomer containing the above-mentioned polymerization-inactive organic compound in an amount of preferably 1 to 1,000 ppm by weight, and further containing β-hydroxypropionic acid and/or acrylic acid dimer in a total amount of preferably 1 to 1,000 ppm by weight (on the basis of the weight converted into unneutralized acrylic acid/the following are the same as above, preferably 1 to 500 ppm by weight, more preferably 1 to 300 ppm by weight), and a methoxyphenol in an amount of 10 to 200 ppm by weight. Such acrylic acid monomer may be obtained by any appropriate process.

If the total amount of the polymerization-inactive organic compound and β-hydroxypropionic acid and/or acrylic acid dimer is less than 1 ppm, excessive increase in temperature due to heat generation during polymerization may inhibit control of polymerization, resulting in lowering of absorption property. If the total amount is too large, a residual monomer (residual acrylic acid) in a water-absorbent resin produced in the present invention may increase.

To an acrylic acid monomer to be used in the present invention, a polymerization inhibitor other than methoxyphenols can be added in the production step. Examples thereof include phenothiazine, hydroquinone, a copper salt, and methylene blue. Unlike a methoxyphenol, such polymerization inhibitors inhibit polymerization, so the inhibitors are desirably added in small amounts. The amounts of the inhibitors in the acrylic acid monomer are preferably in the range of 0 to 0.1 ppm by weight, more preferably 0 ppm by weight (below detection limit).

The protoanemonin and/or furfural content in an acrylic acid monomer to be used in the present invention is preferably in the range of 0 to 20 ppm by weight. As the protoanemonin and/or furfural content increases, the polymerization time (time to achieve a polymerization peak temperature) may be extended, and the amounts of residual monomers may increase. Moreover, although absorption capacity slightly increases, the extractable polymer content increases substantially, resulting in relative lowering of physical properties in many cases. From the viewpoint of improvement of physical properties and characteristics of a water-absorbent resin, the protoanemonin and/or furfural content in an acrylic acid monomer is in the range of more preferably 10 ppm by weight or less, still more preferably 0.01 to 5 ppm by weight, even more preferably 0.05 to 2 ppm by weight, particularly preferably 0.01 to 1 ppm by weight.

The aldehyde (other than furfural) and/or maleic acid content in an acrylic acid monomer to be used in the present invention is in the range of preferably 0 to 5 ppm by weight, more preferably 0 to 3 ppm by weight, particularly preferably 0 to 1 ppm by weight, most preferably 0 ppm by weight (below detection limit). Examples of the aldehyde other than furfural include benzaldehyde, acrolein, and acetaldehyde.

The saturated carboxylic acid (including acetic acid and/or propionic acid) content in an acrylic acid monomer to be used in the present invention is preferably 1,000 ppm by weight or less, more preferably 10 to 800 ppm by weight, particularly preferably 100 to 500 ppm by weight. Such saturated carboxylic acid has volatility and do not polymerize, so if the content is more tan 1,000 ppm by weight, there is the issue of odor. However, addition of a small amount of such saturated carboxylic acid is preferable because it can impart harmless antifungal properties to the water-absorbent resin.

[Basic Substance]

In the present invention, a basic substance may be used. Examples of the basic substance include (bi)carbonates, hydroxides of alkaline metals, ammonia, and organic amines. In order to produce a water-absorbent resin having higher physical properties, a strong alkaline substance, that is, a hydroxide of an alkaline metal such as sodium hydroxide, potassium hydroxide, or lithium hydroxide is preferably used. Among them, sodium hydroxide is particularly preferable.

A basic substance that may be used in the present invention contains iron (in terms of $Fe_2O_3$) in an amount of preferably 0.001 to 10.0 ppm by weight, more preferably 0.01 to 5.0 ppm by weight, still more preferably 0.03 to 4 ppm by weight, even more preferably 0.05 to 2 ppm by weight, particularly preferably 0.1 to 1 ppm by weight relative to the solid content of the basic substance. If the iron content is lower than 0.001 ppm by weight, polymerization may occur before addition of a polymerization initiator, and the polymerization rate may be lowered even if the initiator is added. Iron to be used in the present invention may be Fe ion, and is preferably trivalent iron, particularly preferably $Fe_2O_3$. Note that iron such as $Fe_2O_3$ may be added to an monomer to be used for polymerization or to a basic compound.

The basic substance is disclosed, for example, in WO 2006/109842.

[Others]

In the polymerization step, a water-soluble resin or a water-absorbent resin may be added to the monomers to be used for polymerization in an amount of preferably 0 to 50% by weight, more preferably 0 to 20% by weight to improve various physical properties of a water-absorbent resin produced in the present invention. Meanwhile, various foaming agents (such as carbonates, azo compounds, or bubbles), surfactants, chelating agents, chain transfer agents, etc. may be added in an amount of preferably 0 to 5% by weight, more preferably 0 to 1% by weight to improve various physical properties of a water-absorbent resin produced in the present invention.

(2) Polymerization Step

In the step of polymerizing the monomer component, it is preferable, from the viewpoint of the performance or the ease of controlling the polymerization, to carry out aqueous solution polymerization or reversed-phase suspension polymerization in which the monomer component is used in the form of its aqueous solution. Such polymerization methods may be performed in air atmosphere or in an inert gas (such as nitrogen or argon) atmosphere (for example, oxygen content: 1% or less). Preferably, the polymerization methods may be performed in an inert gas atmosphere. Meanwhile, the monomer component is used for polymerization preferably after oxygen dissolved therein has sufficiently been substituted for an inert gas (for example, oxygen content: less than 1 ppm). The present invention is particularly preferable for the aqueous polymerization which is of high productivity and gives high properties. Examples of particularly preferable aqueous polymerization include continuous belt polymerization and continuous or batch kneader polymerization.

To improve the absorption rate, the polymerization start temperature is preferably 40° C. or higher, more preferably 50° C. or higher, still more preferably 60° C. or higher, particularly preferably 70° C. or higher, most preferably 80° C. or higher, and the upper limit is preferably 150° C. or lower, more preferably 110° C. or lower, still more preferably 100° C. or lower. In the case where the polymerization start temperature is high, dissolved oxygen may be easily removed. If the polymerization start temperature is too low, improvement of absorption rate may not be achieved, while if the polymerization start temperature is too high, absorption capacity and other physical properties such as the extractable polymer content may be lowered. If the polymerization start temperature is lower than 40° C., the induction period and polymerization time are extended, resulting in lowering of not only productivity but also physical properties of a water-absorbent resin produced in the present invention.

From the aspect of physical properties, the polymerization step in the present invention employs preferably reverse-phase suspension polymerization or aqueous polymerization, particularly preferably aqueous polymerization.

The reversed-phase suspension polymerization is a polymerization process in which an aqueous monomer solution is suspended into a hydrophobic organic solvent, and is disclosed in U.S. Pat. No. 4,093,776, U.S. Pat. No. 4,367,323, U.S. Pat. No. 4,446,261, U.S. Pat. No. 4,683,274, U.S. Pat. No. 5,244,735, etc., which are herein incorporated by reference. The aqueous polymerization is a polymerization method in which an aqueous monomer solution is used for polymerization without using any dispersion solvent, and is disclosed in U.S. Pat. No. 4,625,001, U.S. Pat. No. 4,873,299, U.S. Pat. No. 4,286,082, U.S. Pat. No. 4,973,632, U.S. Pat. No. 4,985,518, U.S. Pat. No. 5,124,416, U.S. Pat. No. 5,250,640, U.S. Pat. No. 5,264,495, U.S. Pat. No. 5,145,906, and U.S. Pat. No. 5,380,808, and in EP 0,811,636, EP 0,955,086, and EP 0, 922, 717, which are herein incorporated by reference. The monomers, cross-linking agents, polymerization initiators, and other additives disclosed in such patents may be employed in the present invention. Monomers to be used for polymerization may be used in the form of an aqueous monomer solution, and the concentration of the aqueous solution is in the range of preferably 10 to 70% by weight, still more preferably 20 to 60% by weight.

In the polymerization step of the present invention, the total time from the end of the neutralization and preparation of the monomer component to the start of the polymerization is as short as possible preferably for attaining the improvement of absorption capacity. The polymerization is started preferably within 24 hours, more preferably within 12 hours, still more preferably within 3 hours, particularly preferably within 1 hour.

Industrially, the neutralization and the preparation of the monomer component are performed in large quantities in tanks, so it is usual that the residence time exceeds 24 hours. However, the inventors of the present invention has discovered that the longer time after the preparation of the monomer component and/or neutralization of the acrylic acid monomer provides increase of the residual monomer content and coloring. Thus, to shorten the residence time, the continuous neutralization and the continuous preparation of the monomer component are made to perform a batch polymerization or a continuous polymerization. More preferably, the continuous polymerization is performed.

In the polymerization step of an aqueous monomer solution, polymerization initiators such as: persulfates including potassium persulfate, ammonium persulfate, and sodium persulfate; t-butyl hydroperoxide; hydrogen peroxide; 2,2'-azobis(2-amidinopropane)dihydrochloride; 2-hydroxy-1-phenyl-propan-1-one; and benzoin methyl ether may be used singly or in combination of two or more. Further, if the polymerization initiator is used in combination with a reductant which promotes decomposition of the polymerization initiator, they may be used as a redox initiator. Examples of the reductant include: (bi)sulfites such as sodium sulfite and sodium bisulfite; L-ascorbic acid or its salt; reducible metal salts such as ferrous salts; and amines. Preferable is a redox polymerization initiator of a reductant and a persulfate and/or a peroxide. The polymerization initiator or reductant is used in an amount in the range of preferably 0.001 to 2 mol %, more preferably 0.01 to 0.5 mol % relative to the total monomers to be used for polymerization.

Among those polymerization initiators, preferably hydrogen peroxide and/or (bi)sulfites, more preferably hydrogen peroxide are used, to thereby attain high absorption property of a water-absorbent resin produced in the present invention. In addition to the initiators, other polymerization initiators, in particular, azo compounds may further be used in combination with the hydrogen peroxide and/or (bi)sulfites. The hydrogen peroxide and/or (bi)sulfites are used in an amount of preferably 0.00001 to 0.1 g, more preferably 0.0001 to 0.01 g relative to 1 mol of total monomers to be used for polymerization, and still more preferably in an amount smaller than that of the another polymerization initiator as used in combination therewith. Note that the azo compounds have good effects on the low coloring, but excessive use of persulfates may bring about physical property deterioration or coloring.

Instead of using the polymerization initiator, the polymerization reaction may be performed either by irradiating the reaction system with active energy rays such as radiations, electron beams, and ultraviolet rays, or by using those active energy rays in combination with the polymerization initiator.

The reaction temperature and reaction time in the above-mentioned polymerization reaction may appropriately be set depending on factors such as the kinds of the hydrophilic monomer and polymerization initiator. The polymerization is performed at not higher than the boiling point preferably within more than 0 to 3 hours, more preferably within 2 hour, still more preferably within 1 hours, particularly preferably within 0.5 hours, and at a peak temperature of preferably 150° C. or lower, more preferably in the range of 90 to 120° C. In addition, it is also preferable that water or an acrylic acid monomer (such as acrylic acid) that is vaporized during the polymerization be, if necessary, collected and then recycled to the step of producing a water-absorbent resin.

The production method of the present invention is suitable for production, particularly, continuous production, on a large scale of not smaller than a certain quantity per line. The production method of the present invention may also be applied to production on a laboratory level or to production at pilot or small-scale plants. However, from the viewpoint of monomer stability and polymerization rate, if the present invention is applied to production on a large scale, particularly, of preferably not smaller than 300 kg/hour, more preferably not smaller than 500 kg/hour, still more preferably not smaller than 700 kg/hour in terms of production per line, a water-absorbent resin having sufficient physical properties may be produced.

(3) Drying Step

The polymerization step produces a cross-linked hydrogel polymer. The resultant cross-linked hydrogel polymer is finely disintegrated using a gel crusher, if necessary, and is then dried.

The drying temperature may be set to any appropriate temperature. In the drying step, heating is preferably performed at a temperature higher than the boiling point of a polymerization-inactive organic compound. The drying temperature (defined by heat media temperature) is in the range of preferably 100 to 300° C., more preferably 150 to 200° C., and the drying time is in the range of preferably 1 minute to 3 hours, more preferably 10 minutes to 1 hour. The drying by heating at the above-mentioned temperature and time can further improve absorption capacity of a water-absorbent resin produced in the present invention and reduce the amounts of the residual acrylic acid and residual cross-linking agent.

The drying may be performed by any appropriate method. Examples thereof include drying by heating, hot-air drying, drying under reduced pressure, infrared drying, microwave drying, drum-drier drying, dehydration by azeotropy with a hydrophobic organic solvent, and high humidity drying with high-temperature steam. Drying by heating is preferred.

The solid resin content determined from drying loss (1 g of powder or particles are heated at 180° C. for 3 hours) of a water-absorbent resin after drying is preferably 80% by weight or more, more preferably in the range of 85 to 99% by weight, still more preferably in the range of 90 to 98% by weight, particularly preferably in the range of 92 to 97% by weight.

In the production method of the present invention, the load in the step of finely disintegrating the above-mentioned cross-linked hydrogel polymer (in the step of crushing gel) is low, so lowering of absorption property in the step is suppressed. For example, in the case where a cross-linked hydrogel polymer is finely disintegrated using a screw extrusion crusher such as a meat chopper, a kneading state is not caused. Therefore, a damage caused by a shear force on a molecular chain of the cross-linked hydrogel polymer is suppressed. Moreover, the control of gel particle sizes after crushing is facilitated, so the drying step may be easily controlled and the physical properties may be improved.

The time from the end of the polymerization, via a gel-crushing step if necessary, to the start of the drying is preferably as short as possible, to thereby attain the reduction of the amount of residual acrylic acid. Specifically, the drying of the cross-linked hydrogel polymer is started (the polymer is placed into a dryer) preferably within 1 hour, more preferably within 0.5 hours, still more preferably within 0.1 hours after the polymerization. In addition, to attain the reduction of the amount of a residual monomer and the low coloring, the temperature of the cross-linked hydrogel polymer from the end of the polymerization to the start of the drying is controlled in the range of preferably 50 to 80° C., more preferably 60 to 70° C. On industrial occasions, the polymerization is performed on large scale, therefore it is also usual that the residence time, after the polymerization, exceeds 3 hours. However, as the time increases before the start of the drying and/or as the temperature deviates from the range, the amount of the residual monomer increases and the coloring significantly increases. Thus, preferably, continuous polymerization and continuous drying are performed to shorten the residence time.

(4) Surface Cross-Linking Step

Next, a surface cross-linking step in the present invention will be described. In the present invention, preferably, a resin is dried and then, if necessary, pulverized, classified, and agglomerated, followed by a surface cross-linking step at a predetermined temperature. A water-absorbent resin produced by the production method of the present invention has high physical properties after drying, and the physical properties are further improved by a surface cross-linking step.

The surface cross-linking of a water-absorbent resin is intended to modify the water-absorbent resin so that a part of the surface layer (near the surface: in general, the surface area with a thickness of several tens μm or less) of the resin has high cross-linking density. The water-absorbent resin produced by the production method of the present invention has small extractable polymer content and has high absorption capacity, so the resin has excellent surface cross-linking effect, exerts high physical properties and characteristics, has increased absorption capacity under load (AAP) and permeability potential under pressure (PPUP), and further has reduced odor.

The cross-linking agent to be used for the above-mentioned surface cross-linking may be appropriately selected. From the viewpoint of the physical properties, examples thereof include: cross-linking agents that may react with a carboxyl group such as polyhydric alcohol compounds, epoxy compounds, polyamine compounds or their condensation products with haloepoxy compounds, oxazoline compounds, mono-, di-, or polyoxazolidinone compounds, polyvalent metal salts, and alkylene carbonate compounds.

The surface cross-linking agent as used in the present invention is specifically shown in U.S. Pat. No. 6,228,930, U.S. Pat. No. 6,071,976, and U.S. Pat. No. 6,254,990, which are herein incorporated by reference. Examples thereof include: polyhydric alcohol compounds such as mono-, di-, tri-, tetra-, or polyethylene glycol, monopropylene glycol, 1,3-propanediol, dipropylene glycol, 2,3,4-trimethyl-1,3-pentanediol, polypropylene glycol, glycerine, polyglycerine, 2-butene-1,4-diol, 1,4-butanediol, 1,3-butanediol, 1,5-pentanediol, 1,6-hexanediol, and 1,2-cyclohexanedimethanol; epoxy compounds such as ethylene glycol diglycidyl ether and glycidol; polyamine compounds such as ethylenediamine, diethylenetriamine, triethylenetetramine, tetraethylenepentamine, pentaethylenehexamine, polyethylenimine, and polyamidopolyamines; haloepoxy compounds such as epichlorohydrin, epibromohydrin, and α-methylepichlorohydrin; condensation products between the above-mentioned polyamine compounds and haloepoxy compounds; oxazolidinone compounds such as 2-oxazolidinone; and alkylene carbonate compounds such as ethylene carbonate. Among the cross-linking agents, at least the polyhydric alcohols are preferably used, to thereby maximize the effects of the present invention. The polyhydric alcohols have more preferably 2 to 10 carbon atoms, still more preferably 3 to 8 carbon atoms.

The amount of the surface cross-linking agent to be used in the present invention is preferably in the range of 0.001 to 10 parts by weight, more preferably 0.01 to 5 parts by weight, with respect to 100 parts by weight of the solid content of the resin.

In the present invention, water is preferably used for the surface cross-linking. The amount of water, as used on this occasion, depends upon the water content of the water-absorbent resin as used, but is usually in the range of preferably 0.5 to 20 parts by weight, more preferably 0.5 to 10 parts by weight, with respect to 100 parts by weight of the water-absorbent resin. In addition, a hydrophilic organic solvent may be used alone or in addition to water. The amount of the hydrophilic organic solvent, as used on this occasion, is usually in the range of preferably 0 to 10 parts by weight, more preferably 0 to 5 parts by weight, still more preferably 0 to 3 parts by weight, with respect to 100 parts by weight of the water-absorbent resin. The temperature of the cross-linking agent solution is in the range of preferably 0° C. to the boiling point of the solution, more preferably 5 to 50° C., still more preferably 10 to 30° C., from the viewpoint of the mixability and stability. In addition, the temperature of the water-absorbent resin powder before mixing is in the range of preferably 0 to 80° C., more preferably 40 to 70° C., from the viewpoint of the mixability.

The surface cross-linking step preferably includes premixing the surface cross-linking agent with water and/or the hydrophilic organic solvent, if necessary, and then spraying or dropping (preferably, spraying) the resultant aqueous solution to the water-absorbent resin to mix them together. The sizes of the liquid droplets to be sprayed are in the range of preferably 1 to 300 μm, more preferably 10 to 200 μm. In addition, in the mixing step, water-insoluble fine-particulate powders and/or surfactants may be further added at a concentration in the range of preferably 0 to 10% by weight or less, more preferably 0 to 5% by weight, still more preferably 0 to 1% by weight. The surfactants as used in the surface cross-linking step and the amounts thereof may be determined in accordance with the description of WO 2005/075070, for example.

After being mixed with the surface-cross-linking agent, the resultant water-absorbent resin is preferably subjected to a heating treatment. The heating temperature (defined by heat media temperature) is preferably a temperature equal or higher than the boiling point of the polymerization-inactive organic compound. Specifically, the temperature is in the range of preferably 120 to 250° C., more preferably 150 to 250° C., while the heating time is in the range of preferably 1 minute to 2 hours. The heating treatment can be performed by using any appropriate dryers or heating-furnaces. Examples of the dryers include channel type blending dryers, rotary dryers, disk dryers, fluidized-bed dryers, gas blowing type dryers, and infrared dryers. After being heated, the water-absorbent resin may be cooled, if necessary.

A surface-crosslinking method can refer to the methods as described in EP 0,349,240, EP 0,605,150, EP 0,450,923, EP 0,812,873, EP 0,450,924, EP 0,668,080, JP 07-242709 A, JP 07-224304 A, or U.S. Pat. No. 5,409,771, U.S. Pat. No. 5,597,873, U.S. Pat. No. 5,385,983, U.S. Pat. No. 5,610,220, U.S. Pat. No. 5,633,316, U.S. Pat. No. 5,674,633, U.S. Pat. No. 5,462,972, WO 99/42494, WO 99/43720, and WO 99/42496.

(5) Physical Properties and Shape of Water-Absorbent Resin

[Shape]

The shape of the water-absorbent resin produced by a production method of the present invention may be any appropriate shape. Examples thereof include: particle or powder shapes such as irregular pulverized shapes and spherical shapes; gel shapes; sheet shapes; bar shapes; fiber shapes; and film shapes. In addition, the resin may be combined with or supported on fiber base materials or the like. In general, from the viewpoint of its application such as absorbent articles or gardening afforestation, the particle or powder shapes are preferable. In the case where the water-absorbent resin has a particle or powder shape, the resin may be agglomerated particles or primary particles.

In the case where the water-absorbent resin has a particle or powder shape, the mass median particle size thereof before or after the surface cross-linking is in the range of preferably 10 to 2,000 μm, more preferably 100 to 1,000 μm, still more preferably 200 to 600 μm, particularly preferably 300 to 500 μm. The amount of particles having particle sizes in the range of 850 to 150 μm is in the range of preferably 90 to 100% by weight, more preferably 95 to 100% by weight, particularly preferably 98 to 100% by weight. If the mass median particle size is beyond such ranges, the effects of the resin may be lowered in the case where the resin is used, in particular, as an absorbing article such as a disposable diaper.

[Powder Property]

Even if the water-absorbent resin produced by a production method of the present invention is dispersed in water, the resin can have good powder property (powder friction property) and powder flowability in absorption of moisture without lowering of the surface tension.

As to the powder property, in particular, the powder friction property of the water-absorbent resin produced by a manufacturing method of the present invention, the peak insertion load (PIL) as described in Examples below is in the range of preferably 0 to 5,000 gram weights, more preferably 0 to 3,000 gram weights, still more preferably 10 to 2,000 gram weights, particularly preferably 20 to 1,000 gram weights. If the PIL exceeds 5,000 gram weights, the transportability of the powder may be significantly lowered, resulting in lowering of the absorption property of the water-absorbent resin in producing an absorbing article such as a disposable diaper using the water-absorbent resin. Meanwhile, the peak insertion load (PIL) is too low, in producing an absorbent core to be used in a disposable diaper by mixing the water-absorbent resin with hydrophilic fiber, the water-absorbent resin may be left out from the hydrophilic fiber.

The surface tension of a water-absorbent resin produced by a production method of the present invention is not substantially lowered. Specifically, the surface tension of a water-absorbent resin dispersed liquid, which is prepared by dispersing 0.5 g of the water-absorbent resin in 50 ml of 20° C. physiological saline, is preferably 55 mN/m or more, more preferably 60 mN/m or more, still more preferably 65 mN/m or more, particularly preferably 68 mN/m or more, most preferably 70 mN/m or more. The upper limit of the surface tension of the above-mentioned water-absorbent resin dispersed liquid is preferably 85 mN/m, more preferably 80 mN/m, and still more preferably 78 mN/m. If the surface tension is less than 55 mN/m, the diffusibility of the liquid may be lowered particularly when the water-absorbent resin is used as a sanitary material such as a disposable diaper.

[Absorption Capacity and Extractable Polymer Content]

The water-absorbent resin produced by a production method of the present invention has improved the relationship between the conflicting basic physical properties of the resin, "absorption capacity" and "extractable polymer content", and if the resin is subjected to a surface cross-linking treatment, the physical properties are further improved.

In the above-mentioned water-absorbent resin, the absorption capacity without load (GVs) is preferably 3 g/g or more, more preferably 5 to 200 g/g, still more preferably 20 to 100 g/g. Meanwhile, as to its water insolubility, the resin is substantially water-insoluble, that is, has an extractable polymer content in the range of preferably 0 to 50% by weight, more preferably 0 to 25% by weight, still more preferably 0 to 15% by weight, particularly preferably 0 to 10% by weight. In addition, the GEX value (defined in Examples) defined by the relationship between the absorption capacity (GVs) and the extractable polymer content is preferably 17 or more, more preferably 18 or more, particularly preferably 19 or more.

[Other Physical Properties]

The water-absorbent resin produced by a production method of the present invention has absorption capacity under load (4.8 kPa) against physiological saline of preferably 15 g/g or more, more preferably 20 g/g or more, still more preferably 23 g/g or more, particularly preferably 25 g/g or more.

The water-absorbent resin produced by a production method of the present invention has absorption capacity under load (1.9 kPa) against physiological saline of preferably 15 g/g or more, more preferably 20 g/g or more, still more preferably 25 g/g or more, particularly preferably 28 g/g or more, most preferably 32 g/g or more.

The water-absorbent resin produced by a production method of the present invention has absorption capacity without load (GVs) of preferably 25 g/g or more, more preferably 28 g/g or more, still more preferably 32 g/g or more.

The upper limit of the absorption capacity under or without load is preferably 60 g/g from the viewpoint of the balance between the capacity and other physical properties, and cost.

The water-absorbent resin produced by a production method of the present invention has permeability potential under pressure (PPUP) in the range of preferably 20 to 100%, more preferably 30 to 100%, still more preferably 40 to 100%, most preferably 50 to 100%.

Unlike the absorbency against pressure (AAP), the permeability potential under pressure (PPUP) is an index of stability (no loss) of the absorbency against pressure (AAP) in the case where the amount of the water-absorbent resin (the amount of the resin per unit area for measurement) is increased from 0.90 g to 5.0 g. For example, the amounts of the water-absorbent resin (the amounts of the resin per unit area for measurement) are different at different positions in a disposable diaper, and the variation of the absorbency against pressure (AAP) due to the variation of the amounts of the resin may cause lowering of the physical properties of the diaper in actual use. If the permeability potential under pressure (PPUP) is high, the diaper stably exerts high physical properties and has high permeability regardless of the amount (concentration) of the water-absorbent resin in the diaper. The permeability potential under pressure (PPUP) is specifically described in JP 2005-109779 A (applied on Apr. 6, 2005), and such description is incorporated herein by reference.

As to the permeability, the water-absorbent resin produced by a production method of the present invention has SFC (described in US 2004-254553) of preferably $1 \times 10^{-7}$ ($cm^3 \times sec/g$) or more, more preferably $10 \times 10^{-7}$ ($cm^3 \times sec/g$) or more, still more preferably $50 \times 10^{-7}$ ($cm^3 \times sec/g$) or more.

In the production method of the present invention, polymerization can be performed efficiently, so the amount of residual monomer in a water-absorbent resin produced in the present invention is small and is preferably 0 to 400 ppm or less, more preferably 0 to 300 ppm or less. Meanwhile, the amount of residual internal cross-linking agent in a water-absorbent resin produced in the present invention is small and is preferably substantially ND (not detectable; preferably 1 ppm or less, more preferably 0.1 ppm or less).

[Other Additives]

For imparting various functions to a water-absorbent resin produced by a production method of the present invention, chelating agents, oxidants, reductants such as (bi) sulfites, chelating agents such as aminocarboxylic acid, water-insoluble inorganic or organic powder, deodorants, antibacterial agents, polymer polyamines, polyvalent metal salts such as aluminum salts may be added in an amount of preferably 0 to 10% by weight, more preferably 0 to 1% by weight.

The polyvalent metal salts and inorganic powder are shown in, for example, WO 2004/069915. The chelating agents and deodorants are shown in for example U.S. Pat. No. 6,599,989 and U.S. Pat. No. 6,469,080.

(11) Application

The production method of the present invention provides the easy production of a water-absorbent resin having good absorption properties in excellent balance among the absorption capacity without load (GVs), the absorption capacity under load (AAP), and the extractable polymer content. Such water-absorbent resin is widely used for various purposes such as: water-retaining agents for agriculture and horticulture, rooftop gardening, desert greening; soil improving agent; industrial water-retaining agents, waste liquid fixing agents; humidity-absorbing agents; dehumidifying agents; and building materials. The water-absorbent resin according to the present invention is particularly preferably used for sanitary materials such as disposable diapers, incontinent pads, mother's breast pads, and sanitary napkins.

The water-absorbent resin produced by a production method of the present invention is so excellent with regard to physical properties being in good balance that the water-absorbent resin can be used in sanitary materials (such as disposable diapers) including the water-absorbent resin concentration at a high concentration (weight ratio of the water-absorbent resin to the total weight of the water-absorbent resin and fiber base materials). Specifically, the concentration of the water-absorbent resin is preferably 30 to 100% by weight, more preferably 40 to 100% by weight, and still more preferably 50 to 95% by weight.

Hereinafter, the present invention will be described by way of examples, but is not limited to the examples. Meanwhile, various physical properties described herein were calculated by the following measurement methods. Note that, electrical equipments that were used in the examples were used at 200 V or 100 V unless otherwise specified. Water-absorbent resins were used at a temperature of 25±2° C. and a relative humidity of 50% RH unless otherwise specified. The reagents and instruments shown in the following measurement methods and examples may be appropriately substituted by equivalents.

<Absorption Capacity without Load (GVs/Gel Volume in Saline)>

A water-absorbent resin (0.2 g) was uniformly placed into a nonwoven-fabric-made bag (60 mm×60 mm). The bag was sealed and then immersed into 100 g of an aqueous solution of 0.90% by weight of sodium chloride. Sixty minutes later, the bag was withdrawn and then drained of liquid at 250 G with a centrifuge for 3 minutes, and a weight (W1) of the bag was then measured. The same procedures were performed without using the water-absorbent resin, and a weight of the empty bag (W2) was determined. Then, the absorption capacity without load (GVs) was calculated in accordance with the following equation (1).

$$GVs=(W1-W2)/0.2-1 \qquad \text{Equation (1)}$$

<Extractable Polymer Content>

184.3 g of an aqueous solution of 0.90% by weight of sodium chloride was weighed and put into a plastic container with a lid (volume: 250 ml), and 1.00 g of a water-absorbent resin was added to the aqueous solution, followed by stirring for 16 hours, to thereby extract extractable contents in the resin. The extracted solution was filtered using a sheet of filter paper (Advantec Toyo Kaisha, Ltd., product name: (JIS P 3801, No. 2), thickness: 0.26 mm, holding particle size: 5 μm), and 50.0 g of the resultant filtrate was weighed and used as a measurement solution.

First, for only physiological saline, titration was performed to pH 10 with an aqueous solution of 0.1 N NaOH and then to pH 2.7 with an aqueous solution of 0.1 N HCl, to thereby determine blank titration volumes ([bNaOH] ml, [bHCl] ml). The same procedures were performed for the measurement solution, to thereby determine titration volumes ([NaOH] ml, [HCl] ml). For example, in the case of a water-absorbent resin including known amounts of an acrylic acid and a sodium salt thereof, the extractable polymer content (major component: extracted water-soluble polymer) in the water-absorbent resin was calculated in accordance with the following equation (2) based on the average molecular weights of the monomers and titration volumes determined by the above-mentioned procedures. In the case where the weights of the monomers were unknown, the average molecular weights of the monomers were calculated based on the neutralization rate (equation (3)) determined by the titration.

$$\text{extractable polymer content (\% by weight)}=0.1\times(\text{average molecular weight})\times184.3\times100\times([HCl]-[bHCl])/1,000/1.0/50.0 \qquad \text{Equation (2)}$$

$$\text{neutralization rate (mol \%)}=(1-([NaOH]-[bNaOH])/([HCl]-[bHCl]))\times100 \qquad \text{Equation (3)}$$

<GEX Value>

In general, the extractable polymer content tends to be larger when absorption capacity (GVs) is higher, and in a water-absorbent resin, the conflicting relationship between the GVs value and extractable polymer content (x) is important. In the case where x exceeds 1% by weight, the GEX value was evaluated as an index showing the relationship. If the GEX value is high, the resin is evaluated as a high performance resin. The GEX value was defined by the following equation (4) where the GVs value and extractable polymer content are represented as y (g/g) and x (% by weight), respectively.

$$\text{GEX value}=(y)/\ln(x) \qquad \text{Equation (4)}$$

Note that the GVs value (y (g/g)) and extractable polymer content (x (% by weight)) required for calculating the GEX value were determined as described above.

<Amount of Residual Monomer>

The amount of a residual monomer (an acrylic acid or a salt thereof) of water-absorbent resin powder after drying was determined as follows. 184.3 g of an aqueous solution of 0.90% by weight of sodium chloride was weighed and put into a 250-ml plastic container with a lid, and 1.00 g of a water-absorbent resin was added to the aqueous solution, followed by stirring for 2 hours. Then, the solution was filtered, and the resultant filtrate was subjected to a UV analysis by liquid chromatography. On the other hand, the amount of a residual monomer of hydrogel before drying was determined as follows. A hydrogel containing about 500 mg of a solid resin content was finely disintegrated and stirred for 16 hours, and the filtrate was subjected to a UV analysis by liquid chromatography in the same manner as described above, followed by correction of the solid resin content.

<Absorbency Against Pressure (AAP) (Absorbency Against Pressure Under Pressure of 4.8 kPa on Aqueous Solution of 0.90% by Weight of Sodium Chloride)>

0.900 g of a water-absorbent resin (or particulate water absorbing agent) was uniformly sprayed on a 400-mesh stainless-steel metal gauze (mesh opening size: 38 μm) deposited on one side (bottom) of cylindrical cross-sections of the bottom of a plastic support cylinder (inner diameter: 60 mm), and a piston (cover plate) with an outer diameter slightly smaller than 60 mm, which leaves no space between its wall and the support cylinder and smoothly moves up and down, was placed on the resin, followed by measurement of the weight of the support cylinder+water-absorbent resin+cover plate (W3 (g)). A weight was placed on the cover plate so that 4.9 kPa of load was uniformly applied on the water-absorbent resin including the cover plate including the cover plate, thus completing a set of measurement apparatus. A glass filter (diameter: 90 mm, thickness: 5 mm) was put inside a petri dish (diameter: 150 mm), and physiological saline adjusted to 25° C.±2° C. was added to the dish until it reached the upper surface of the glass filter. A sheet of filter paper with a diameter of 9 cm (manufactured by Toyo filter paper, No. 2) was put thereon so that the entire surface got wet, and the excessive solution was removed.

The above-mentioned set of measurement apparatus was put on the wet filter paper to absorb the solution under load. If the solution level was lower than the upper surface of the glass filter, the solution was further added to keep the solution level constant. One hour later, the set of measurement apparatus was picked up, and the weight was removed, followed by measurement of the weight W4 (g) (the weight of the support cylinder+swollen water-absorbent resin+cover plate). Then, based on the weights W3 and W4, the absorbency against pressure (g/g) was calculated in accordance with the following equation.

Absorbency against pressure (AAP: 0.90 g) (g/g)=
(weight $W4$ (g)−weight $W3$ (g))/weight of water-absorbent resin (or particulate water absorbing agent (g))

Note that the absorbency against pressure under a pressure of 4.9 kPa (water-absorbent resin: 0.90 g) is referred to as AAP 4.9 kPa, and in the case where the load is changed to 1.9 kPa, it is referred to as AAP 1.9 kPa.

<Permeability Potential Under Pressure (PPUP)>

The procedures for the measurement of the absorbency against pressure under a pressure of 4.9 kPa (AAP: 0.90 g) were repeated in the same manner except that the amount of the water-absorbent resin was changed from 0.900 g to 5.000 g, to thereby determine a value of the absorbency against pressure (AAP: 5.0 g). Note that, in the case where the water-absorbent resin has high absorbency against pressure (AAP: 5.0 g), the layer of the swollen water-absorbent resin may become extremely thick, so the height of the support cylinder to be used herein should be sufficiently large. Based on the absorbency against pressure (AAP: 0.90 g), (AAP: 5.0 g) determined by the above-mentioned procedures, the permeability potential under pressure (PPUP) was calculated in accordance with the following equation.

Permeability potential under pressure (PPUP) (%)=
(AAP: 5.0 g (g/g)/AAP: 0.90 g (g/g))×100

<Peak Time and Induction Time>

The temperature of the monomer during the polymerization or the resultant polymer gel was measured using a thermometer, and the time (minutes) from addition of an initiator to a rise of temperature was defined as the induction time. In addition, the time to a maximum temperature (peak temperature) in the polymerization system was defined as the peak time.

<Mass Median Particle Size (D50)>

Water-absorbent resin powder was classified by sieving with JIS standard sieves having mesh opening sizes of 850 μm, 710 μm, 600 μm, 500 μm, 425 μm, 300 μm, 212 μm, 150 μm, 106 μm, 75 μm, etc. (JIS Z8801-1 (2000) and the like), and then the percentages of the residues on those sieves were plotted on logarithmic probability paper and the mass median particle size (D50) was read. The classification method was as follows. Under conditions of room temperature (20 to 25° C.) and a relative humidity of 50±5% RH, 10 g of water-absorbent resin powder was placed onto a JIS standard sieve (The IIDA TESTING SIEVE: inner diameter=80 mm), and then classified using a ro-tap sieve shaker (IIDA SIEVE SHAKER, TYPE: ES-65, manufactured by IIDA) for 10 minutes. After that, in accordance with U.S. Pat. No. 5,026,800, the column 10 (1), a logarithmic standard deviation value (σζ) was calculated. Note that the mass median particle size (D50) is, as disclosed in U.S. Pat. No. 5,026,800 or the like, defined as follows. That is to say, in a case where 50% by weight of the entire particles are classified with a standard sieve having a certain mesh opening size, the mesh opening size of the standard sieve is taken as the weight-average particles diameter (D50).

<High Performance Liquid Chromatography Analysis and Distribution Index>

The distribution index of a multifunctional (meth)acrylate-based cross-linking agent having polyethylene glycol structural units was determined by high performance liquid chromatography. First, multifunctional (meth)acrylate-based cross-linking agents having polyethylene glycol structural units including different ethylene oxide repeating units (numbers of added ethylene oxide molecules) were separated, and the area ratio (area percentage) of fractions with different numbers of added ethylene oxide molecules was detected. After that, a total sum of the area ratio of the number of added ethylene oxide molecules corresponding to a fraction with the maximum area ratio and the area ratios (area percentages) of the fractions corresponding to the number of added ethylene oxide molecules of a fraction with the maximum area ratio±2 was defined as a distribution index.

For example, in a case where the maximum area ratio of a fraction separated by high performance liquid chromatography corresponds to a number of added ethylene oxide molecules of 10, the total sum of area ratios of fractions corresponding to numbers of added ethylene oxide molecules of 8, 9, 10, 11, and 12 was calculated as a distribution index.

In separating the multifunctional (meth)acrylate cross-linking agents with different numbers of added ethylene oxide molecules into fractions and detecting them, a mixed solution of ion exchange water and methanol (1/1) was used as an eluent, and 5 μL of a sample solution was passed through a column (Inertsil/ODS-2 manufactured by GL Sciences Inc.) at a flow rate of 0.8 ml/min while being incubated at 35±0.1° C., and detected by using an analyzer (manufactured by Shimadzu Corporation, SPD-10AVP) by TV (wavelength: 254 nm). Other conditions were appropriately selected.

Note that, the distribution index of a mono(meth)acrylate compound having polyethylene glycol structural units was also analyzed in the same manner as described above.

<Quantification of Para(P)-Methoxyphenol>

UV analysis was performed by liquid chromatography.

<Protoanemonin Content, Furfural Content>

Standard samples were subjected to quantitative analysis with a gas chromatograph (GC-7A, manufactured by Shimadzu Corporation) and a data processor (C-R6A, manufactured by Shimadzu Corporation) under the following conditions.

Detector: FID

Hydrogen level: 30 m/min

Air level: 0.5 L/min

Column: Hard glass tube of 3 mm in inner diameter and 3.1 m in length

Filler: Chromosorb W column

Temperature of thermostatic chamber: 100° C.

Temperature of sample-injecting part: 150° C.

Flow rate of carrier gas: nitrogen 40 mL/min

<Powder Property Evaluation>

To evaluate powder fluidity of a water-absorbent resin, the peak insertion load (PIL) was measured in accordance with the description of US 2005/0118423 (p. 17, [0210]). Note that, in the measurement, particles that pass a metal gauze with a mesh opening size of 600 μm (JIS standard sieve) and do not pass a metal gauze with a mesh size of 300 μm were used as samples. The PIL was measured in accordance with the above-mentioned description except that the initial point was changed to a range of 0 mm to 10 mm (insertion distance: 0 to 10 mm) to measure the peak insertion load in the case of the insertion distance in the range of 0 to 10 mm.

<Saline Flow Conductivity (SFC)>

The saline flow conductivity was determined in accordance with US 2004/254553.

<Surface Tension>

Into a 100-ml beaker that had been sufficiently washed was poured 50 ml of physiological saline adjusted to 20° C., and first, a surface tension of the physiological saline was measured using a surface tensiometer (K11 automatic surface tensiometer, Kruss). In this measurement, the surface tension level should be in the range of 71 to 75 mN/m. Next, a fluororesin rotor that had been sufficiently washed (length: 25 mm) and 0.5 g of a water absorbing agent were put in the beaker containing the physiological saline adjusted to 20° C. after the measurement of the surface tension, and the mixture was stirred at 500 rpm for 4 minutes. Four minutes later, the stirring was stopped, and the water absorbing agent which has absorbed water was allowed to precipitate, followed by measurement of the surface tension of a supernatant in the same manner as described above. Note that, in the present invention, the plate method using a platinum plate was employed where the plate was used after sufficient washing and heat-washing using a burner.

<Transmission>

The mono(meth)acrylate compound having polyethylene glycol structural units and the multifunctional (meth)acrylate-based cross-linking agent having polyethylene glycol structural units were dissolved in ion exchange water which had been filtered by a cellulose acetate filter with a pore size of about 2 mm, to thereby prepare an aqueous solution of 20% by weight. For the resultant aqueous solution, light transmission (%) at 500 nm was determined at 25±1° C. using a spectrophotometer (U-2010 SPECTROPHOTOMETER manufactured by Hitachi, Ltd.) and by using the above-mentioned ion exchange water as a blank (100%).

<Absorbent Core Performance Evaluation: Rewet Evaluation>

To evaluate the performance of a water-absorbent resin produced in the present invention as an absorbent core, an absorbent core was produced and used for evaluation of the rewet.

(Method of Producing Absorbent Core for Evaluation)

Water-absorbent resin powder (2 parts by weight) and pulverized wood pulp (2 parts by weight) were dry-mixed using a mixer. The resultant mixture was spread on a 400-mesh wire screen (mesh opening size=38 μm) and molded into a web with a diameter of 90 mmΦ. The web was pressed at a pressure of 196.14 kPa (2 kgf/cm$^2$) for 1 minute, to thereby yield an absorbent core for evaluation with a basis weight of about 0.06 g/cm$^2$.

(Method of Evaluating Rewet)

An absorbent core for evaluation was placed on a bottom of a SUS petri dish with an inner diameter of 90 mmΦ, and covered with a nonwoven fabric with a diameter of 90 mmΦ. After that, a cover plate and a weight were placed so that 4.8 kPa of load was uniformly applied onto the absorbent core. The cover plate and the weight were equipped with solution-injecting inlets with a diameter of 5 mm at their center. Subsequently, 25 ml of physiological saline (aqueous solution of 0.90% by weight of sodium chloride) was poured into the center of the absorbent core for evaluation to allow the absorbent core to absorb the solution. Thirty minutes later, 25 ml of the physiological saline (aqueous solution of 0.90% by weight of sodium chloride) was additionally poured into the center of the absorbent core to allow the absorbent core to absorb the solution for additional 30 minutes. Thirty minutes later, the cover plate and the weight were removed, and 30 sheets of filter paper with an outer diameter of 90 mmΦ (No. 2, manufactured by Toyo filter paper) (the total weight (W5 (g)) had been determined) were placed on the absorbent core for evaluation. Then, a cover plate and a weight (total weight: 20 kg) were immediately placed on the filter paper with an outer diameter of 90 mmΦ so that load was uniformly applied on the absorbent core, the nonwoven fabric, and the filter paper. The load was applied on them for 5 minutes to allow the filter paper to absorb the residual solution. After that, the weight of the 30 sheets of filter paper (W6 (g)) was measured. The rewet was calculated in accordance with the following equation.

Rewet (g)=$W6$ (g)–$W5$ (g)

Production Example 1

Commercially available acrylic acid (special-grade reagent, available from Wako Pure Chemical Industries, Ltd.; p-methoxyphenol content=200 ppm), as obtained by catalytic gas phase oxidation, was supplied into a column bottom of a high-boiling-point-impurities-separating column having fifty dual-flow perforated plates, and then distilled with toluene as an azeotropic solvent in a reflux ratio of 1 and then further re-distilled, to thereby yield an acrylic acid composition (1) including acrylic acid at a concentration of 99% or more and only trace amounts of impurities (mainly, water) (also referred to as "purified acrylic acid").

The acrylic acid composition (1) had a p-methoxyphenol content of ND (less than 1 ppm by weight), protoanemonin, furfural, β-hydroxypropionic acid, and acrylic acid dimer contents of ND (less than 1 ppm by weight), and a toluene content of 1 ppm by weight. Meanwhile, the acrylic acid composition (1) had a phenothiazine content of 0 ppm, aldehyde and maleic acid contents of 1 ppm or less, and acetic acid and propionic acid contents of 200 ppm.

Then, 90 ppm of p-methoxyphenol (relative to solid content of the acrylic acid) was added to the acrylic acid composition (1), to thereby yield an acrylic acid composition (2).

Production Example 2

A 5 L-five-necked flask equipped with two dropping funnels, a pH meter, a thermometer, and stirring blades was charged with 1,598 g of ion exchange water. In addition, separately, 1,280 g of the acrylic acid composition (2) consisting substantially of acrylic acid at room temperature and 1,488 g of a 48% by weight aqueous sodium hydroxide solution (Fe 0.5 ppm by weight/in terms of $Fe_2O_3$) at room temperature were placed into the two dropping funnels, respectively, and the 5 L-flask was immersed into a water-cooling bath. Next, while the temperature of the neutralization reaction system in the 5 L-flask was maintained at 35° C. or lower under stirring, the 48% by weight aqueous sodium hydroxide solution and the acrylic acid composition (2) were added dropwise into the flask at the same time as each other. The dropwise addition of the acrylic acid composition (2) was completed in about 35 minutes, and the dropwise addition of the 48% by weight aqueous sodium hydroxide solution was completed in about 45 minutes. After the completion of the dropwise addition of the acrylic acid composition (2), the dropping funnel washed with 100 g of ion exchange water, and all the used washing water was then added into the flask. Furthermore, after the completion of the dropwise addition of the 48% by weight of aqueous sodium hydroxide solution, the dropping funnel was similarly washed with 100 g of ion exchange water, and all the used washing water was then added into the flask.

After the completion of all of the dropwise additions, the temperature was adjusted to the range of 20 to 35° C. to age the reaction mixture for 20 minutes. After this aging, an extremely small quantity of the acrylic acid composition (2) was dropwise added to adjust the pH to 10 (±0.1), to thereby yield an aqueous sodium acrylate solution (1) having a monomer concentration of 37% by weight and a neutralization rate of 100 mol %.

Production Example 3

Commercially available polyethylene glycol and toluene were charged into a 5 L-flask, and a catalyst was then added, followed by stirring. Subsequently, acrylic acid was sequentially added dropwise to perform a dehydration reaction while the mixture was heated. After completion of the reaction, washing was performed with an excessive amount (relative to the reaction the solution) of an aqueous saturated sodium sulfate solution, and the aqueous saturated sodium sulfate solution was removed by decantation. The procedure was repeated ten times, and then 500 ppm by weight of p-methoxyphenol (relative to charged polyethylene glycol) was added, followed by nitrogen bubbling to remove toluene, to thereby yield a polyethylene glycol diacrylate (1). The resultant polyethylene glycol diacrylate (1) was found to have an average number of ethylene oxide repeating units of 8, a distribution index of 72.9, and a transmission of 99%.

Production Example 4

10 parts by weight of polyethylene glycol monoacrylate (the average number of ethylene oxide repeating units: 9) were mixed with 90 parts by weight of the polyethylene glycol diacrylate (1) obtained in Production Example 3, to thereby yield a cross-linking agent composition (1). The transmission of the cross-linking agent composition (1) was found to be 98%.

Production Example 5

2 parts by weight of polyethylene glycol monoacrylate (the average number of ethylene oxide repeating units: 9) were mixed with 98 parts by weight of the polyethylene glycol diacrylate (1) obtained in Production Example 3, to thereby yield a cross-linking agent composition (2). The transmission of the cross-linking agent composition (2) was found to be 98%.

Production Example 6

0.5 part by weight of polyethylene glycol monoacrylate (the average number of ethylene oxide repeating units: 10) was mixed with 99.5 parts by weight of the polyethylene glycol diacrylate (1) obtained in Production Example 3, to thereby yield a cross-linking agent composition (3). The transmission of the cross-linking agent composition (3) was found to be 99%.

Example 1

A 1 L-cylindrical polypropylene container with a lid was prepared as a polymerization container.

The acrylic acid composition (2) obtained in Production Example 1 (23.0 g), the aqueous sodium acrylate solution (1) obtained in Production Example 2 (244.0 g), ion exchange water (95.2 g), and the cross-linking agent composition (1) obtained in Production Example 4 as an internal cross-linking agent (0.1 mol %) (relative to the total monomers) were mixed in an aqueous solution, to thereby yield an aqueous monomer solution (1) with a concentration of the monomer of 33% by weight and a neutralization rate of 75 mol %.

Further, while being kept at 25° C., the aqueous monomer solution (1) was charged into the above-mentioned cylindrical container, and then nitrogen gas was introduced into the solution to deaerate the system with nitrogen gas to reduce a dissolved oxygen content to 1 ppm or less. Next, while the cylindrical container was incubated in a thermally insulated state, an aqueous solution including sodium persulfate (0.12 g/mol) and L-ascorbic acid (0.001 g/mol) as a polymerization initiator was added to the aqueous monomer solution (1) to start static polymerization. The polymerization was performed for an induction time of 30 seconds, for a peak time of 27 minutes, and at a peak temperature of 95° C. After having reached the peak temperature, the polymerization was continued for another 30 minutes, to thereby yield a cylindrical cross-linked hydrogel polymer (1).

The resultant cross-linked hydrogel polymer (1) was cooled to room temperature and then cut into pieces with sizes of about 20 mm to 40 mm square with scissors, and the pieces were subjected to gel crush using a desktop extruder (Iiduka Kogyo Corporation, MEAT-CHOPPER TYPE: 12 VR-400K DSX, die diameter: 6.2 mm) to finely disintegrate them into smaller pieces, to thereby yield a cross-linked hydrogel polymer (2).

The cross-linked hydrogel polymer (2) after crushing had weak adhesion, low cohesion, and low adherability to the desktop extruder. The resultant cross-linked hydrogel polymer (2) was spread onto a 850-μm metal gauze, and then dried by hot air of 180° C. (dew point: 70° C.) for 90 minutes. Then, the dry polymer was pulverized with a vibration mill, and then classified with a JIS 850-μm standard sieve, to thereby yield a passed product, that is, a water-absorbent resin powder (1).

For the resultant water-absorbent resin powder (1), various physical properties were determined. The results are shown in Table 1.

Example 2

The procedures of Example 1 were repeated in the same manner except that the cross-linking agent composition (2) obtained in Production Example 5 was used instead of the cross-linking agent composition (1), to thereby yield a water-absorbent resin powder (2).

For the resultant water-absorbent resin powder (2), various physical properties were determined. The results are shown in Table 1.

Example 3

The procedures of Example 1 were repeated in the same manner except that the cross-linking agent composition (3) obtained in Production Example 6 was used instead of the cross-linking agent composition (1), to thereby yield a water-absorbent resin powder (3).

For the resultant water-absorbent resin powder (3), various physical properties were determined. The results are shown in Table 1.

Comparative Example 1

The procedures of Example 1 were repeated in the same manner except that the polyethylene glycol diacrylate (1) obtained in Production Example 3 was used instead of the cross-linking agent (1), to thereby yield a comparative cross-linked hydrogel polymer (1) with cylindrical form. The polymerization was performed for an induction time of 35 seconds, for a peak time of 31 minutes, and at a peak temperature of 93° C. In the same manner as Example 1, the comparative cross-linked hydrogel polymer (1) was cut into pieces with sizes of about 20 mm to 40 mm square with scissors and the pieces were subjected to gel crush using a desktop extruder to finely disintegrate them into smaller pieces, to thereby yield a comparative cross-linked hydrogel polymer (2). Subsequently, the comparative cross-linked hydrogel polymer (2) was spread onto a 850-μm metal gauze, and then dried by hot air of 180° C. (dew point: 70° C.) for 90 minutes. After that, the dry polymer was pulverized with a vibration mill and then classified with a JIS 850-μm standard sieve, to thereby yield a passed product, that is, a comparative water-absorbent resin powder (1).

For the resultant comparative water-absorbent resin powder (1), various physical properties were determined. The results are shown in Table 1.

Comparative Example 2

The acrylic acid composition (2) obtained in Production Example 1 (23.0 g), the aqueous sodium acrylate solution (1) obtained in Production Example 2 (244.0 g), ion exchange water (95.2 g), the polyethylene glycol diacrylate (1) obtained in Production Example 3 as an internal cross-linking agent (0.1 mol %) (relative to the total monomers), and polyethylene glycol monoacrylate (the average number of ethylene oxide repeating unites: 10) (1.5 mol %) (relative to the total monomers) were mixed in an aqueous solution, to thereby yield an aqueous monomer solution (2) with a neutralization rate of 75 mol %. The same procedures of Example 1 were repeated for the aqueous monomer solution (2), to thereby yield a comparative water-absorbent resin powder (2).

For the resultant comparative water-absorbent resin powder (2), various physical properties were determined. The results are shown in Table 1.

In addition, the rewet of an absorbent core as obtained from the comparative water-absorbent resin powder (2) was found to be 10 g.

Example 4

The cross-linked hydrogel polymer (2) (20 g) was put into a JIS standard sieve having a mesh opening size of 5.60 mm (JIS Z8801-1), and the sieve was immersed into a bath containing an aqueous solution of 20% by weight of sodium chloride. Then, the sieve was shaken for about 5 minutes in such a matter that the cross-linked hydrogel polymer did not spill out from the top of the sieve, and the amount of the gel remaining on the meal gauze having a mesh opening size of 5.60 mm was determined. As a result, the amount of the residual gel was found to be 0.2 g, and the cross-linked hydrogel polymer (2) was found to have good gel crush characteristic.

Comparative Example 3

The procedures of Example 4 were repeated in the same manner except that the comparative cross-linked hydrogel polymer (2) was used instead of the cross-linked hydrogel polymer (2). As a result, the amount of the residual gel remaining on the metal gauze having a mesh opening size of 5.60 mm was found to be 18 g. The comparative cross-linked hydrogel polymer was found to have significantly lowered gel crush characteristic.

Example 5

A surface cross-linking agent including 0.4 parts by weight of 1,4-butanediol, 0.6 parts by weight of propylene glycol, 3.0 parts by weight of ion exchange water, and 0.5 parts by weight of isopropanol (weight ratio relative to the resultant powders) were sprayed to 100 parts by weight of each of the water-absorbent resin powders (1) to (3) to mix them together, followed by a heating treatment at 210° C. for 40 minutes, to thereby yield surface-cross-linked water-absorbent resin powders (4) to (6).

The PPUP levels of the water-absorbent resin powders (4) to (6) were found to be 66%, 70%, and 73%, respectively.

Meanwhile, the SFCs of the water-absorbent resin powders (4) to (6) were found to be $30 \times 10^{-7}$ (cm$^3 \times$sec/g), $42 \times 10^{-7}$ (cm$^3 \times$sec/g), and $55 \times 10^{-7}$ (cm$^3 \times$sec/g), respectively.

In addition, the rewets of absorbent cores as obtained from the water-absorbent resin powders (4) to (6) were found to be 5 g, 4 g, and 4 g, respectively.

Comparative Example 4

One gram of an aqueous solution containing 10% by weight of polyoxyethylene sorbitan monostearate (1 g) was added to and mixed with 10 g of the comparative water-absorbent resin powder (1) obtained in Comparative Example 1, and the mixture was dried by hot air at 120° C. and passed through a JIS 850-μm standard sieve, to thereby yield a comparative water-absorbent resin powder (4).

For the resultant comparative water-absorbent resin powder (4), various physical properties were determined. The results are shown in Table 1.

Meanwhile, the rewet of an absorbent core as obtained from the comparative water-absorbent resin powder (4) was found to be 12 g.

TABLE 1

|  | Example 1 | Example 2 | Example 3 | Comparative Example 1 | Comparative Example 2 | Comparative Example 4 |
|---|---|---|---|---|---|---|
| Ratio of mono(meth)acrylate compound to cross-linking agent (mol %) | 11.8 | 2.2 | 0.5 | 0 | 150 | 0 |
| Amount of cross-linking agent (mol %: relative to the total monomers) | 0.09 | 0.1 | 0.1 | 0.1 | 0.1 | 0.1 |
| GVs (g/g) | 45 | 44 | 43 | 44 | 20 | 43 |
| Extractable polymer content (%) | 10 | 9 | 9 | 11 | 30 | 11 |
| GEX value | 19.5 | 20.0 | 19.6 | 18.3 | 5.8 | 18.3 |
| PIL (gram weight) | 850 | 2,300 | 3,200 | 4,300 | 2,000 | 880 |
| Surface tension | 69.3 | 72.1 | 75 | 75 | 42.5 | 43.5 |

CONCLUSION

In all the cases of Examples 1 to 5 and Comparative Examples 1 to 3, acrylic acid monomers were polymerized using polyethylene glycol diacrylate as an internal cross-linking agent to yield water-absorbent resins.

Compared to the water-absorbent resin of Comparative Example 1 (produced without adding polyethylene glycol monoacrylate), the water-absorbent resins of Examples 2 and 3 (produced by adding predetermined amounts of polyethylene glycol monoacrylate) were found to have reduced extractable polymer contents, improved GEX values (relationship between the absorption capacity (GVs) and extractable polymer content), and reduced PIL values, i.e., powder properties (friction resistances). Meanwhile, the water-absorbent resin of Comparative Example 2 (produced by adding a large amount of ethylene glycol monoacrylate) was found to have significantly reduced absorption capacity and lowered GEX value (relationship between the absorption capacity (GVs) and the extractable polymer content) compared to the water-absorbent resins of Examples 1 to 3 (produced by adding predetermined amounts of ethylene glycol monoacrylate). The water-absorbent resin having improved powder property (friction resistance) has excellent transportability and impact resistance. Meanwhile, as described in Example 1 and Comparative Example 1, use of a predetermined amount of polyethylene glycol monoacrylate enables reduction of the polymerization time.

In Example 4 and Comparative Example 3, the gel crush load was evaluated. Compared to the water-absorbent resin of Comparative Example 4 (produced without adding polyethylene glycol monoacrylate), the water-absorbent resin of Example 4 (produced by adding an extremely small amount of polyethylene glycol monoacrylate) was found to have good gel crush characteristic. Uniform gel crush achieves not only high productivity but also reduction in the drying load, and facilitates pulverization after drying and control of sizes of particles.

In Example 5, the resin was further subjected to a surface cross-linking treatment, and the resultant water-absorbent resin of the present invention produced by adding polyethylene glycol monoacrylate was found to have significantly improved PPUP.

Moreover, both of prevention of lowering of powder properties and prevention of lowering of surface tensions were achieved in Examples 1 to 3, but were not realized in Comparative Examples 1, 2, and 4.

Note that, not shown in Table 1, the amounts of residual cross-linking agents were ND, and the amounts of residual monomers were 300 ppm or less.

According to the production method of the present invention, there can be achieved easy production of a water-absorbent resin having good absorption properties in excellent balance among the absorption capacity without load (GVs), the absorption capacity under pressure (AAP), and the extractable polymer content. The water-absorbent resin is widely used for various purposes such as: water-retaining agents for agriculture and horticulture, rooftop gardening, desert greening, and the like; soil improving agents; industrial water-retaining agents; waste liquid fixing agents; humidity-absorbing agents; dehumidifying agents; and building materials. The water-absorbent resin of the present invention is particularly preferably used for sanitary materials such as disposable diapers, incontinent pads, mother's milk pads, and sanitary napkins.

Many other modifications will be apparent to and be readily practiced by those skilled in the art without departing from the scope and spirit of the invention. It should therefore be understood that the scope of the appended claims is not intended to be limited by the details of the description but should rather be broadly construed.

What is claimed is:

1. A method of producing a polyacrylic acid (salt)-based water-absorbent resin, comprising the steps of:
   (a) neutralizing an acid moiety derived from an acrylic acid monomer,
   (b) polymerizing an aqueous monomer solution containing the acrylic acid monomer in an amount of 90 mol % or more relative to the total monomers excluding a cross-linking agent in the presence of a cross-linking agent, and
   (c) drying the resultant polymer by heating;
      wherein the aqueous monomer solution comprises the acrylic acid monomer, the cross-linking agent and a mono(meth)acrylate compound;

wherein the cross-linking agent comprises a multifunctional (meth)acrylate-based cross-linking agent (i) having polyethylene glycol structural units including a total of 6 to 200 ethylene oxide repeating units and (ii) in an amount of $1.0 \times 10^{-3}$ to 1.0 mol % relative to the amount of the acrylic acid monomer;

wherein the mono(meth)acrylate compound has polyethylene glycol structural units;

wherein the amount of the mono(meth)acrylate compound having polyethylene glycol structural units is $1.0 \times 10^{-5}$ to 0.5 mol % relative to the amount of the acrylic acid monomer; and wherein ratio of the mono(meth)acrylate compound having polyethylene glycol units is 0.5 to 11.8 mol % relative to the amount of the multifunctional (meth)acrylate-based cross-linking agent having polyethylene glycol structural units including a total of 6 to 200 ethylene oxide repeating units; and the surface tension of water absorbent resin obtained is from 55 mN/m to 85 mN/m.

2. A method of producing a water-absorbent resin according to claim 1, wherein:

a molecular weight distribution defined based on a distribution index of the ethylene oxide repeating units of the multifunctional (meth)acrylate-based cross-linking agent is 50 to 100%.

3. A method of producing a water-absorbent resin according to claim 1, wherein the aqueous monomer solution further comprises a (meth)acryloyloxy acrylate-based cross-linking agent having polyethylene glycol structural units in an amount of 0.01 to 30% by weight relative to an amount of the multifunctional (meth)acrylate-based cross-linking agent.

4. A method of producing a water-absorbent resin according to claim 1, wherein a ratio of a number of the polyethylene glycol structural units of a multifunctional (meth)acrylate-based cross-linking agent to a number of the polyethylene glycol structural units of the mono(meth)acrylate compound is in a range of 0.5 to 2.0.

5. A method of producing a water-absorbent resin according to claim 1, further comprising the step of surface cross-linking including heating after the step of drying the resultant polymer by heating.

6. A method of producing a water-absorbent resin according to claim 1, wherein the acrylic acid monomer solution further comprises a polymerization-inactive organic compound having a solubility parameter of $1.0 \times 10^4$ to $2.5 \times 10^4$ $(Jm^{-3})^{1/2}$ in an amount of 1 to 1,000 ppm by weight.

7. A method of producing a water-absorbent resin according to claim 1, wherein the acrylic acid monomer solution further comprises iron in an amount of 0.01 to 5 ppm by weight.

8. A method of producing a water-absorbent resin according to claim 2, wherein the aqueous monomer solution further comprises a (meth)acryloyloxy acrylate-based cross-linking agent having polyethylene glycol structural units in an amount of 0.01 to 30% by weight relative to an amount of the multifunctional (meth)acrylate-based cross-linking agent.

9. A method of producing a water-absorbent resin according to claim 2, wherein a ratio of a number of the polyethylene glycol structural units of a multifunctional (meth)acrylate-based cross-linking agent to a number of the polyethylene glycol structural units of the mono(meth)acrylate compound is in a range of 0.5 to 2.0.

10. A method of producing a water-absorbent resin according to claim 3, wherein a ratio of a number of the polyethylene glycol structural units of a multifunctional (meth)acrylate-based cross-linking agent to a number of the polyethylene glycol structural units of the mono(meth)acrylate compound is in a range of 0.5 to 2.0.

11. A method of producing a water-absorbent resin according to claim 2, further comprising the step of surface cross-linking including heating after the step of drying the resultant polymer by heating.

12. A method of producing a water-absorbent resin according to claim 3, further comprising the step of surface cross-linking including heating after the step of drying the resultant polymer by heating.

13. A method of producing a water-absorbent resin according to claim 2, wherein the acrylic acid monomer solution further comprises a polymerization-inactive organic compound having a solubility parameter of $1.0 \times 10^4$ to $2.5 \times 10^4$ $(Jm^{-3})^{1/2}$ in an amount of 1 to 1,000 ppm by weight.

14. A method of producing a water-absorbent resin according to claim 3, wherein the acrylic acid monomer solution further comprises a polymerization-inactive organic compound having a solubility parameter of $1.0 \times 10^4$ to $2.5 \times 10^4$ $(Jm^{-3})^{1/2}$ in an amount of 1 to 1,000 ppm by weight.

15. A method of producing a water-absorbent resin according to claim 2, wherein the acrylic acid monomer solution further comprises iron in an amount of 0.01 to 5 ppm by weight.

16. A method of producing a water-absorbent resin according to claim 3, wherein the acrylic acid monomer solution further comprises iron in an amount of 0.01 to 5 ppm by weight.

17. A method of producing a water-absorbent resin according to claim 1, wherein:

neutralization at least occurs before polymerization.

18. A method of producing a water-absorbent resin according to claim 1, wherein:

neutralization at least occurs during polymerization.

19. A method of producing a water-absorbent resin according to claim 1, wherein:

neutralization at least occurs after polymerization.

* * * * *